United States Patent
Stephenson, Jr.

[11] 3,657,702
[45] Apr. 18, 1972

[54] TRANSACTION ACCUMULATOR FOR A CREDIT VERIFICATION SYSTEM

[72] Inventor: Kenrick O. Stephenson, Jr., Upper Montclair, N.J.

[73] Assignee: Digital Data Systems Corp.

[22] Filed: Aug. 19, 1970

[21] Appl. No.: 64,976

[52] U.S. Cl....................................340/149 R, 340/149 A
[51] Int. Cl......................................G06k 5/00, H04g 3/00
[58] Field of Search..............340/149, 149 A, 152; 235/61.7, 235/61.7 B

[56] References Cited

UNITED STATES PATENTS

| | | | |
|---|---|---|---|
| 3,564,210 | 2/1971 | Presti | 340/149 A X |
| 3,121,159 | 2/1964 | Rogal | 235/61.7 B UX |
| 3,394,246 | 7/1968 | Goldman | 340/149 A |

Primary Examiner—Donald J. Yusko
Attorney—Woodcock, Washburn, Kurtz & Mackiewicz

[57] ABSTRACT

In a system for verification of a customer's credit status in response to entry of a charge account number at a remote location, the level of credit sale activity is accumulated. Each time that a valid credit signal is sent to a remote location the accumulated level of credit sale activity is incremented. This accumulated level is compared to a predetermined run level. When it exceeds this level a run signal is sent to the point of sale to prevent completion of the sale. The accumulated credit sale activity is stored in sectors of a magnetic drum. The accumulation is periodically advanced from sector to sector. When the accumulation reaches the last sector it is timed out. In this way unusual credit card activity in a given period of time is determined. This activity is also compared to a hold level. If the activity exceeds the hold level the accumulation is inserted back into the first sector of the drum so that it is held in the accumulator for another period of time.

8 Claims, 5 Drawing Figures

3,657,702

TRANSACTION ACCUMULATOR FOR A CREDIT VERIFICATION SYSTEM

BACKGROUND OF THE INVENTION

This invention relates to credit verification systems and more particularly to a system for accumulating the credit sale activity against any particular charge account number to prevent large losses from unauthorized use of the credit card.

This invention is an improvement upon the credit verification system described in U.S. Pat. No. 3,576,539, Huber and Stephenson.

The aforementioned credit verification system provides high speed verification of a customer's credit status. The customer's charge account number is entered at the point of sale either manually by means of a keyboard or by a coded card and a card reader capable of reading the account number. The counter unit at the point of sale transmits the account number to be verified and receives and operates on return signals which command one of the following responses. The sales slip is embossed and/or a signal given that the number inquired against is a valid number and is not listed in the negative account file stored in the central processor. Or the sales slip is not embossed and/or a signal is given that the customer's account number is to be referred to the credit department. Or, the sales slip is not embossed and the sales person is notified by a signal that the number entered on the keyboard does not check digit verify, i.e., it is an invalid number. In this event the number is reentered.

In credit verification systems, the danger always exists that an unauthorized person will obtain a customer's credit card or a customer's charge account number. In such a case it is possible for this unauthorized person to run up a large volume of sales in a short period of time.

SUMMARY OF THE INVENTION

In accordance with an important aspect of this invention the credit sale activity for each charge account number in a given period of time is accumulated and the accumulation is compared to a predetermined level. When the accumulation exceeds this level a signal is given that there is a run on this charge account number and further sales are held up until the situation can be checked out by the credit manager. A clock clears the transaction accumulator after the accumulation has been in storage for a predetermined amount of time.

In accordance with another important aspect of this invention the level of credit card activity is determined by the number of transactions in a given period of time. The number of transactions is compared to a run level and when the number exceeds this predetermined level completion of further sales is stopped.

In accordance with another aspect of this invention the accumulator includes a plurality of sequential storage sectors on a cyclical storage medium, for example a magnetic drum. The accumulated credit sale activity is advanced from sector to sector in response to a digital clock. When the accumulated credit sale activity advances to the last sector, it is erased from the drum. In this manner the accumulated activity is timed out of the accumulator after it has been stored for a given period of time.

In accordance with a further aspect of this invention the accumulated credit sale activity is compared with a hold level. When the credit sale activity exceeds the hold level the accumulation is transferred from the last sector back to the first sector of the accumulator. In this manner the accumulation is held for another given period of time to determine whether it will exceed the run level in the second period of time.

The foregoing and other objects, features, and advantages of the invention will be better understood from the following more detailed description and appended claims in conjunction with the drawings.

DESCRIPTION OF THE DRAWINGS

FIG. 2a shows the sectors of the magnetic drum;

DESCRIPTION OF A PARTICULAR EMBODIMENT

Figure 1:
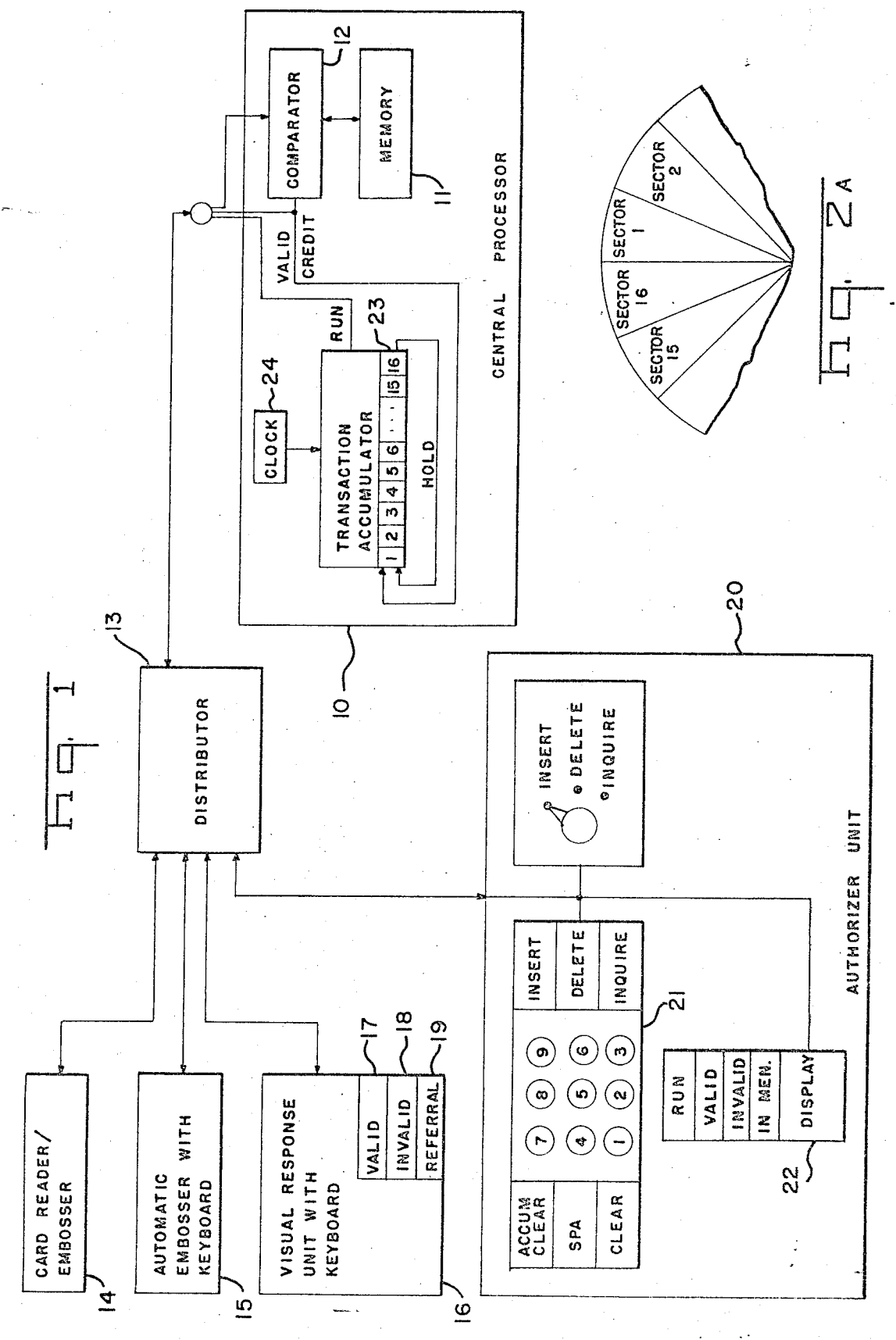
FIG. 1 is a block diagram of the system.

The present invention is directed to the transaction accumulator for the credit verification system shown in FIG. 1. The credit verification system includes a central processor 10 having a memory 11 for storing signals representing charge account numbers of customers whose credit is not to be honored. Alternatively, the memory may store charge account numbers of customers whose credit is to be honored, or all charge account numbers may be stored with an appropriate indication of credit status. Charge account numbers are transmitted to the central processor where they are compared, in the comparator 12, with the numbers in memory 11 to determine whether there is a negative credit status. If there is, an "in memory" signal is sent to the remote location. If there is no negative credit indication a "valid credit" signal is sent to the remote location.

These signals are transmitted on one of a plurality of distributor units, the distributor unit 13 being shown.

At least three different types of counter units may be used with this system. The card reader/embosser indicated at 14 reads indicia on a credit card inserted in a slot. It automatically embosses a sales slip if a valid credit signal is received from the central processor.

The automatic embosser with keyboard, indicated at 15 also automatically embosses the sales slip if a valid credit signal is received. The customer's credit card number is inserted into the system by the keyboard.

The visual response unit 16 has a keyboard for entering the customer's credit card number. In response to the return signal from the central processor one of the three lights 17, 18 and 19 will be energized. The green light 17 indicates a valid credit status and that the sale may be completed. When the yellow light 18 is energized there is an indication that the entered number does not check digit verify. In this case the number is entered again. The red lamp light 19 indicates either that the number is "in memory" or that the transaction accumulator of the present invention has indicated a run." This signifies to the sales clerk that the sale is to be referred to the credit manager.

Normally, there is one credit manager in each store who has an authorizer unit of the type indicated at 20. The authorizer unit has provision for inserting new numbers into memory, deleting credit card numbers from memory, and inquiring as to the status of an account. When a transaction is referred to the credit manager, he enters the number on the keyboard 21 with an inquire request. In response, one of the displays 22 will be energized to indicate either that the card is in memory, is invalid, is valid, or that there is a run on this card. The authorized unit also has provisions, indicated by the SPA button on the keyboard 21 for authorizing a single purchase at the discretion of the credit manager. The credit manager may also clear the transaction accumulator by depressing the ACCUUM. CLEAR button. The transaction accumulator of this invention determines the run condition. The transaction accumulator is in the central processor 10. The transaction accumulator includes 16 storage sectors on a cyclical magnetic storage medium 23, in this case a magnetic drum. Each time a VALID CREDIT signal is sent to a counter unit the account number that was checked is recorded in the first storage sector. Each additional purchase causes the count associated with that credit number to be increased by one and the charge account number with the incremented number to be rerecorded back in the first sector. The number accumulated with each charge account number is compared to a predetermined number of transactions. This number is adjustable. When an accumulated number associated with a particular charge account exceeds the set predetermined number, a run indication is signified.

Normally, the count stored in the transaction accumulator is timed out. That is, under control of a digital clock 24 the count of credit sale transactions associated with each account number is advanced from sector to sector. For example, the first transaction will be recorded in sector 1. After an hour this number will be transferred to sector 2, the next hour to sector 3, the next to sector 4 and so on. If the number reaches sector 16 without causing run condition, it is timed out of the system.

There is an exception to timing out the number after it reaches the 16th sector. If the number of transactions has reached a hold level, which is a fraction of the stop level, then the number is kept in the transaction accumulator by reinserting it back into the first sector. For example, assume the stop level is at six transactions. The hold level is automatically set at four transactions. If our transactions are made in 16 store hours, this charge account is held in the transaction accumulator for another 16 hours. If another purchase is made during this time, the charge account number is reinserted into the transaction accumulator and held for another 16 hours. In this manner, unusual credit card activity will always be called to the attention of the credit manager.

Figure 2:
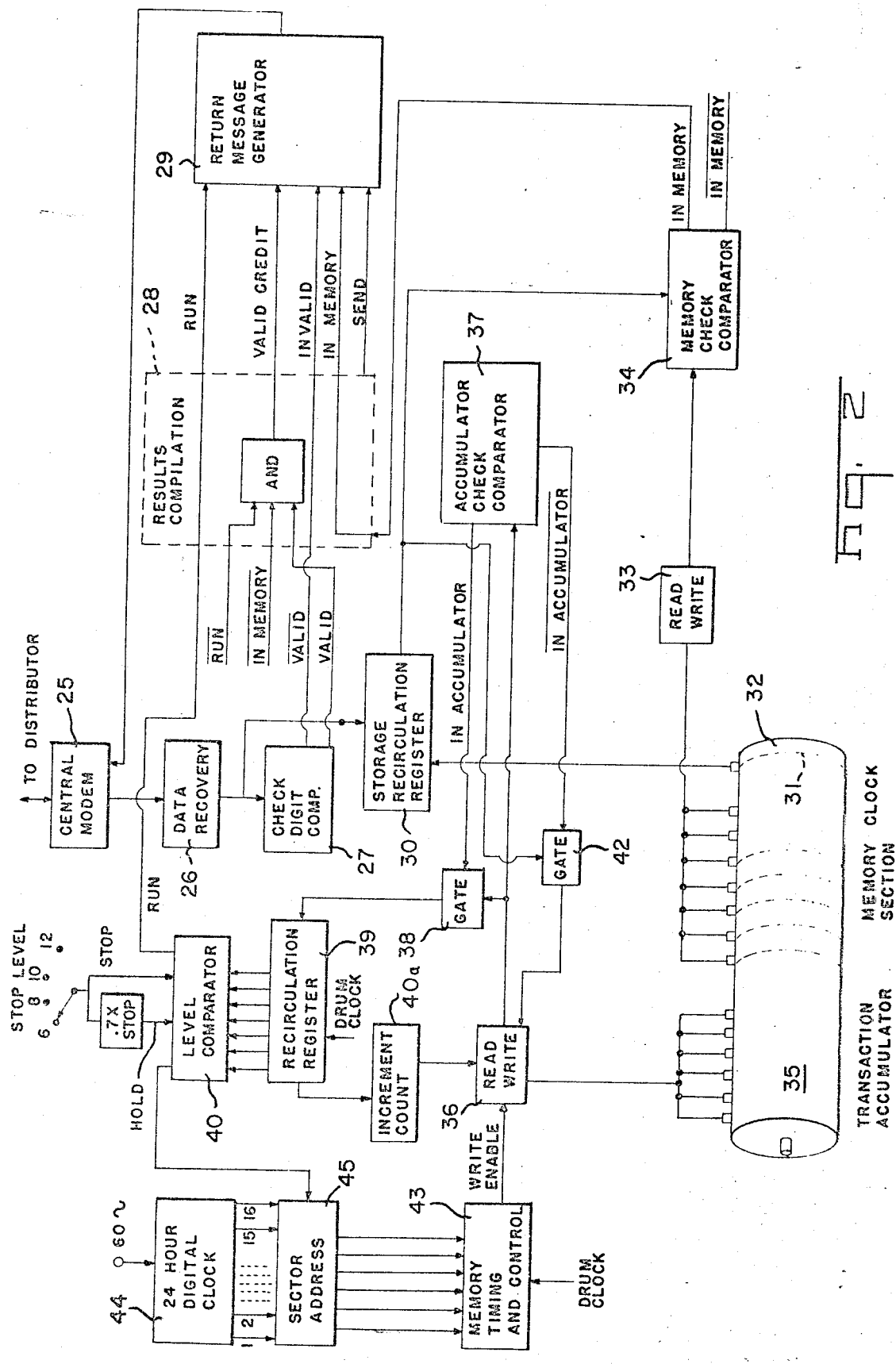
FIG. 2 is a block diagram of a portion of the central processor having the transaction accumulator.

The transaction accumulator is shown in detail in FIG. 2. The transaction accumulator is shown in FIG. 2 with other elements of the central processor which make the present invention more understandable. As more fully explained in the Stephenson and Huber patent application, encoded charge account numbers are transmitted from a counter unit, through distributor units, to the central modem 25. Data recovery circuit 26 produces at its output the signal received from the central distributor. This signal is checked with the check digit comparator 27 to determine whether the message sent is a valid charge account number. If the message received is an invalid charge account number results compilation circuitry 28 enables the return message generator 29 to generate another send signal. If the retransmitted message is invalid, an invalid signal is generated by return message generator 29.

The received charge account number is set into the storage recirculation register 30 where it is continuously recirculated so that the number continuously appears at the output thereof. The recirculation is performed under control of clock pulses derived from the clock track 31 of the magnetic drum 32.

Read-write circuitry 33 is normally in the condition to read charge account numbers sequentially from the memory section of the drum 32. All of the charge account numbers contained in memory are sequentially read and applied to the memory check comparator 34. The numbers from memory are compared with the output of the storage recirculation register 30. If the memory check comparator determines that the message in storage recirculation register 30 is a number in memory, the results compilation circuit 28 is set to an "in memory" condition. This enables the return message generator 29 to generate an in memory signal which is applied to the central modem 25.

Each time a charge account number is inquired against, all of the sectors of the transaction accumulator portion 35 of the drum are read out to determine whether the number is in the transaction accumulator. The numbers in all sectors of the transaction accumulator are continuously read and applied through read-write circuitry 36 to the accumulator check comparator 37. The numbers from the transaction accumulator are compared with the credit card number in the storage recirculation register 30. If the number in register 30 is in the accumulator, the gate 38 is enabled to set the number, together with the accumulated number of transactions, into the recirculation register 39.

A level comparator 40 compares the accumulated number of transactions with the stop level. The stop level can be any desired number, and it is adjustable. As one example, stop levels of six, eight, 10 or 12 transactions in a 16 hour period of retail store operation are selectable. If the accumulated number exceeds the stop level, a run signal is produced. This is applied to the return message generator 29. As one example, the message 001 may be used to signal the run condition. This is workable in the system of the aforementioned Huber and Stephenson application wherein the valid signal is 010, the in memory signal is 011 and the invalid signal is 100.

The accumulated count of transactions in the register 39 is incremented by one in the circuit 40. The incremented count, together with the associated charge number, is then rewritten, through read-write circuitry 36, into the first sector and simultaneously erased from the sector of the transaction accumulator from which it was read.

If the charge account number being inquired against is not already in the transaction accumulator, the gate 42 is opened by the IN ACCUMULATOR signal from the accumulator check comparator 37. In this case the charge account number in recirculation register 30 passes through gate 42 to be written into the first sector of the transaction accumulator. This is done under control of the memory timing and control unit 43.

The sectors of the magnetic drum are depicted in FIG. 2a. Normally, the memory timing and control will rewrite information back into the same storage location from which it is read. There are exceptions to this. Of course, if the credit card number is not already in the transaction accumulator it will be stored in sector one. The other exception is that once each hour, as determined by the digital clock 44, the sector address of each item stored in the transaction accumulator is incremented by one so that the account number and associated accumulated credit transactions are advanced to the next sector. That is, each hour all account numbers stored in sector one are transferred to sector two; all account numbers in sector two are transferred to sector three and so on. This advancement continues for 16 hours of operation of the retail store. When the account number reaches sector 16, at the next hour it will normally be timed out of the accumulator. There is an exception to the timing out of the accumulated transactions when it reaches sector 16. If the accumulated transactions reach the hold level then the accumulation is kept in the transaction accumulator for another 16 hours. For example, the hold level may be set at 7/10ths of the stop level. That is, if the stop level is set at six, the hold level is 4. If the accumulated transactions exceed the hold level, as determined by the level comparator 40, then the sector address control 45 is switched so that the number in sector 16 is rerecorded in sector one.

The operation of the transaction accumulator may be briefly summarized as follows. Each received charge account number is stored in recirculation register 30. It is compared, in accumulator check comparator 37, with the charge account numbers recorded in the transaction accumulator section 35 of the magnetic drum 32. If the number is already in the transaction accumulator it is set into the recirculation register 39. The level comparator 40 compares the number of transactions accumulated with the stop level. If the number exceeds the stop level, a run indication is applied to return message generator 29 which sends out a 1 message to the counter unit.

If the transaction is valid, the accumulation is incremented by 1 in the circuit 40 and rerecorded, through read-write circuit 36 onto the first sector of the transaction accumulator and simultaneously erased from its current sector.

If the received credit charge account number is not already in the transaction accumulator, the number is applied, through gate 42 and read-write circuit 36, to the first sector of the transaction accumulator. Each hour the charge account number and associated accumulation is advanced to another sector. Under control of the clock 44, sector address circuitry 45, and memory timing and control unit 43, each hour the numbers in each sector are advanced by one sector. Normally, when the numbers reach sector 16 without causing a run condition, they are timed out. However, if during the 16 hour period from the last transaction the number of transactions exceeds the hold level, then the charge account number and associated accumulation is put back into the first sector of the transaction accumulator where it will remain for another 16 hours until it is time out.

Figure 3:
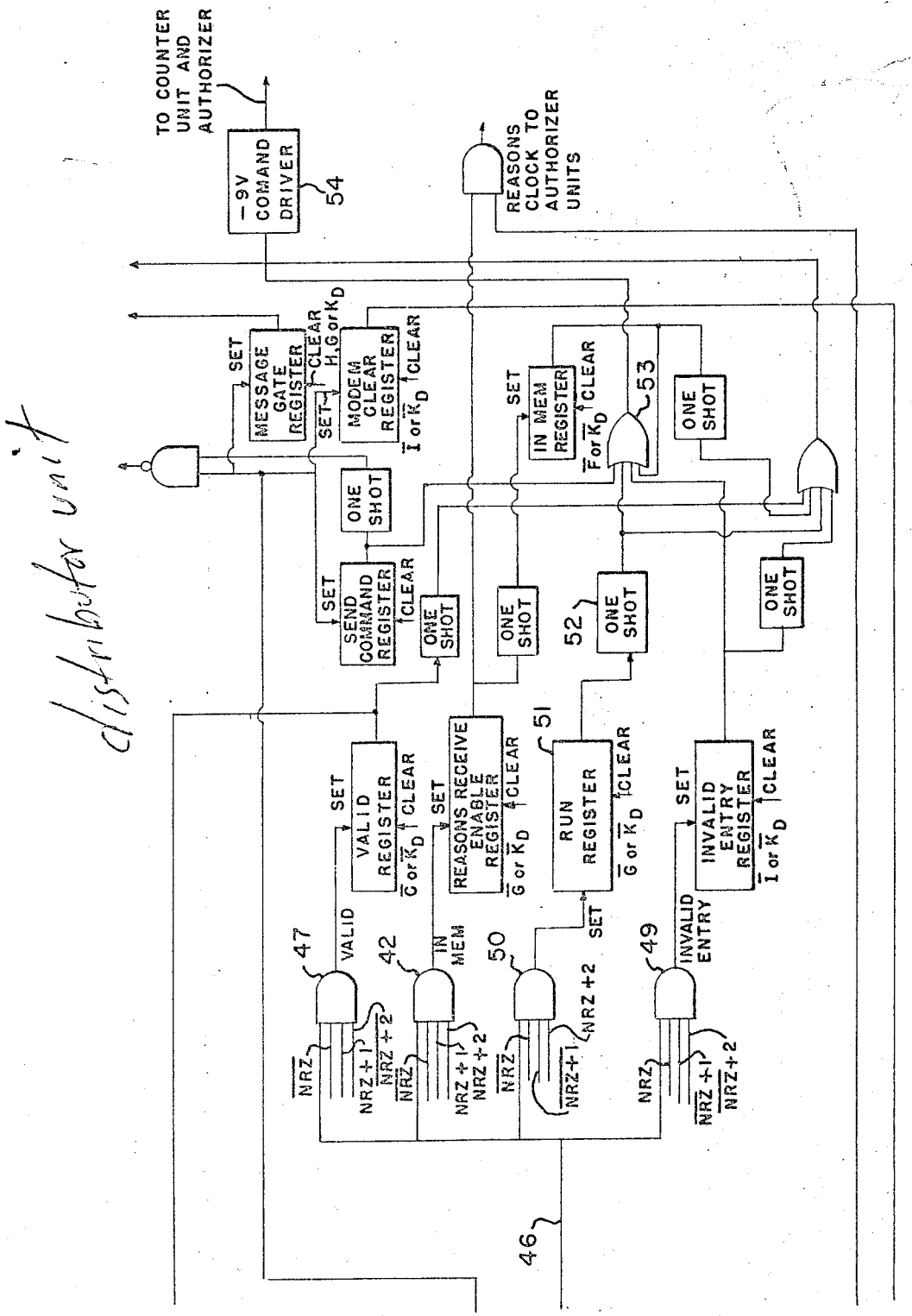
FIG. 3 shows a portion of the distributor unit.

FIG. 3 shows a portion of the distributor circuitry which receives the messages from the return message generator in the central processor and converts them to a signal which is transmitted to the counter unit and to the authorizer unit. The circuitry shown in FIG. 3 is the same as the circuitry shown in FIG. 6d of the aforementioned Huber and Stephenson U.S. Pat. No. 3,576,539 with the following exceptions. The messages received from the central processor are received on the line 46. The valid, in memory and invalid messages are decoded by the gates 47–49 as described in the aforementioned Huber and Stephenson U.S. Pat. No. 3,576,539. The run message, 001, is decoded by the AND gate 50. This sets the run register 51 which will remain in the set condition a predetermined amount of time. This acts through one-shot 52 and OR-gate 53 to turn on the −9 volt command driver 54. This applies a negative level signal to the multiplexer and subsequently to the counter unit and to the authorizer unit.

As explained in the aforementioned Huber and Stephenson U.S. Pat. No. 3,576,539, both the in memory and the invalid signals are of negative polarity but of different time duration. The command driver 54 is turned on to produce a negative polarity signal of time duration intermediate between the in memory and invalid signals. The counter unit has no circuitry for distinguishing between the time duration of the run signal and the in memory signal. Therefore, when a −9 volt run signal is applied to a counter unit, it will react in the same way as if an in memory signal were received. As explained in the aforementioned Huber and Stephenson U.S. Pat. No. 3,576,539 this will either turn on the referral lamp in the keyboard entry unit or prevent the embosser unit from operating.

Figure 4:
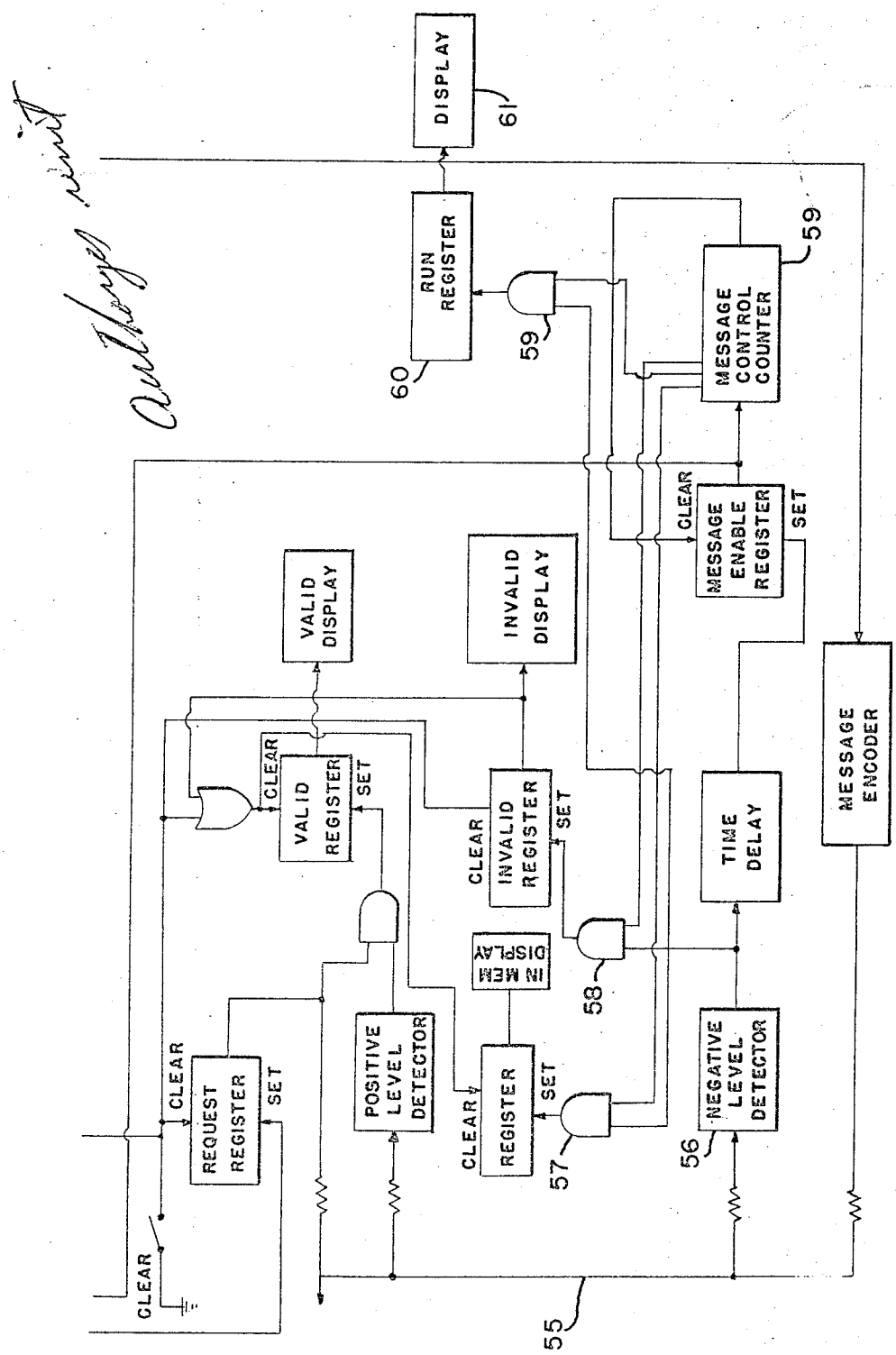
FIG. 4 shows a portion of the authorizer unit.

The authorizer unit has provision for distinguishing between the in memory and the run signal. Referring to FIG. 4, the circuitry of the authorizer unit which produces the in memory, valid, invalid and run displays is shown. This circuitry is the same as that described in more detail in FIG. 9a of the aforementioned Huber and Stephenson U.S. Pat. No. 3,576,539 with the exceptions which follow. The negative level signals from the distributor are applied to the line 55 and detected by the negative level detector 56. This negative level is applied to each of the AND gates 57–59. As more fully explained in the aforementioned Huber and Stephenson U.S. Pat. No. 3,576,539, the message control counter 59 counts out time after receipt of a negative level pulse. These counted times are applied to the AND gates 57, 58 and 59. This enables the AND gates 57–59 to detect negative level pulses of differing time durations. The negative level pulse of intermediate time duration will cause the AND gate 59 to set the run register 60. This causes a run display as indicated at 61. Upon observing this display, the credit manager can take steps to insure that the unusual charge account activity which has been exhibited is in fact bona fide activity by the authorized holder of of that charge account number.

In the foregoing description the level of credit card activity was measured by the number of transactions recorded. Of course other indicia of credit card activity may be used. One particularly good indicia of credit card activity is the dollar volume of sales transactions. It is a simple modification of the present system to encode the dollar amount of each transaction and transmit this to the central location. The dollar amount can then be accumulated in the same manner that transactions are accumulated. By comparing the accumulated dollar amount to a set dollar amount, a run signal is produced only when the credit card activity exceeds a predetermined dollar level.

Other modifications are within the true spirit and scope of this invention. The appended claims are intended to cover any such modifications.

What is claimed is:

1. A system for verification of customers' credit status in response to entry of a charge account number at remote locations comprising:
   a central processor unit having a storage means for storing signals representing charge account numbers,
   a plurality of counter units at said remote locations each having means for encoding the charge account number,
   means for transmitting the encoded charge account number to said central processor unit,
   comparing means in said central processor unit for comparing the data received with signals stored in said storage means to determine whether a credit sale transaction should be completed on the encoded charge account number,
   an accumulator for accumulating the credit sale activity on each encoded charge account number transmitted to said central processor, said accumulated activity being automatically updated in substantially immediate response to a transmission from a counter unit at the time of a transaction,
   means for registering a run indication after said accumulated activity has reached a predetermined run level, and
   clock means for automatically clearing said accumulator a clocked period after the transmission from the counter unit.

2. The system recited in claim 1 wherein said accumulator records the number of transactions and wherein said negative indication is registered after a predetermined number of transactions have been accumulated on a particular charge account number.

3. The system recited in claim 1 wherein said transaction accumulator comprises:
   a plurality of sequential and addressed storage sectors on a cyclical magnetic storage medium, and
   means for advancing the accumulated activity from address to address until it is recorded and erased from the last address in the sequence.

4. The system recited in claim 3 further comprising:
   means for transferring said accumulated activity from the last address to the first address on said cyclical storage medium when said activity exceeds a hold level which is less than said run level.

5. The system recited in claim 4 wherein said cyclical magnetic storage medium includes memory timing and control circuits for normally rewriting each said accumulated activity in the same sector from which it is read and
   sector address circuitry responsive to said clock for periodically advancing the address of the sector into which said accumulated activity is rewritten.

6. The system recited in claim 1 further comprising:
   an authorizer unit at a location at which a credit manager can supervise the credit sale activity at a plurality of said counter units, said authorizer unit including:
   means responsive to the registration of said run indication for displaying to said credit manager an indication that a charge account number transmitted from a counter unit under his supervision has exhibited an unusual level of credit sale activity.

7. The system recited in claim 3 wherein said transaction accumulator further comprises means for transferring said accumulated activity to the first address when said activity is updated.

8. The system recited in claim 1 wherein said clock means clears said transaction accumulator of said accumulated activity said clocked period of time after the last transaction.

* * * * *